United States Patent

Blanchard, Jr. et al.

[11] 3,884,432
[45] May 20, 1975

[54] HIGH-LIFT AIRCRAFT

[75] Inventors: Willard S. Blanchard, Jr.; Joseph L. Johnson, Jr., both of Hampton, Va.

[73] Assignee: National Aeronautics and Space Administration Office of General Counsel, Washington, D.C.

[22] Filed: June 5, 1973

[21] Appl. No.: 367,268

[52] U.S. Cl. ............ 244/15; D12/76; 244/13; 244/42 DA; 244/55
[51] Int. Cl. ............ B64c 15/02; B64d 27/00
[58] Field of Search ......... 244/34 R, 13, 15, 42 CC, 244/55, 90 R, 42 DA, 53 R, 54, 2; D71/1 E, 1 F, 1 G; 60/224; D12/76

[56] References Cited
UNITED STATES PATENTS

| 1,348,983 | 8/1920 | Covino | 244/45 R |
|---|---|---|---|
| 2,439,048 | 4/1948 | Korff | 244/42 DA X |
| 2,585,411 | 2/1952 | Schultz | 244/90 R X |
| 2,891,740 | 6/1959 | Campbell | 244/15 |
| 3,018,983 | 1/1962 | Davidson | 244/15 |
| 3,122,343 | 2/1964 | Leibach et al. | 244/55 X |
| 3,260,481 | 7/1966 | Winborn | 244/42 R |
| 3,658,279 | 4/1972 | Robertson | 244/53 R |
| 3,774,864 | 11/1973 | Hurkamp | 244/13 |
| D198,249 | 5/1964 | Sleeman et al. | D71/1 E |

FOREIGN PATENTS OR APPLICATIONS

| 736,071 | 6/1943 | Germany | 244/13 |

*Primary Examiner*—Trygve M. Blix
*Assistant Examiner*—Barry L. Kelmachter
*Attorney, Agent, or Firm*—Howard J. Osborn; Wallace J. Nelson; John R. Manning

[57] ABSTRACT

An aerodynamically balanced high-lift aircraft wherein the problems of large nose-down pitching moments generated by the flap high-lift forces, the loss of trim lift during high-lift flight and the yawing moments caused by the loss of an engine are solved without the use of large horizontal and vertical tails. Also the level of sideline and forward radiated noise is reduced without mechanical apparatus. In the present aircraft, a wing is carried by and bounded on the tips by spaced-parallel fuselages; horizontal tails are mounted only onto the outboard surfaces of the wing-tip fuselages, the centroid-of-lift of the high-lift flaps is located substantially at the center-of-gravity of the aircraft and the exhausts of the engines are emitted in the vertical plane of symmetry of the aircraft. In the aircraft of the present invention, yawing moments occuring during flight with an engine inoperative will be reduced; the horizontal tails will carry an upload and contribute positive trim lift; large nose-down pitching moments generated by the high-lift flaps will be minimized and noise levels will be reduced.

6 Claims, 8 Drawing Figures

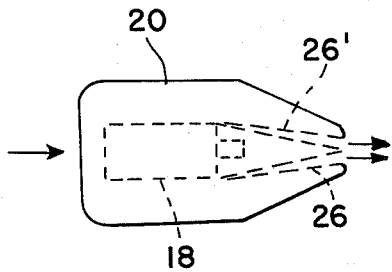 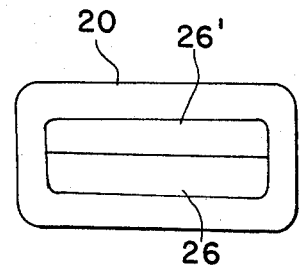
FIG. 4a        FIG. 4b
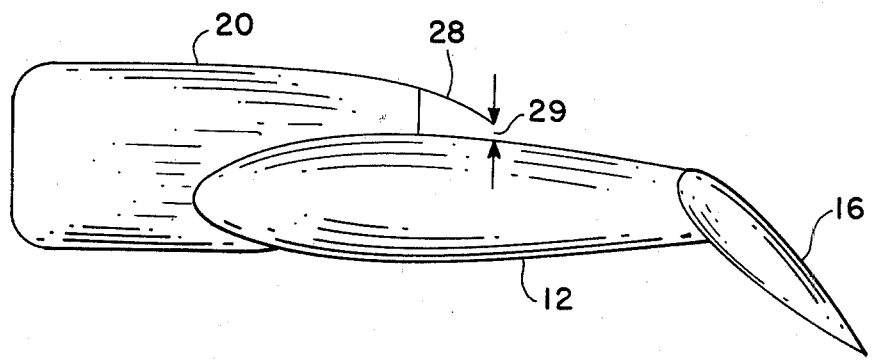
FIG. 5

HIGH-LIFT AIRCRAFT

BACKGROUND

The present invention relates generally to aerial vehicles and more specifically to a high-lift aircraft having stability and control, performance, and noise characteristics superior to those of current high-lift aircraft. Stability, control, performance, and noise problems plaguing current high-lift aircraft include large nose-down pitching moments generated by the flap high-lift forces, large yawing moments resulting from loss of an engine, and high engine noise levels.

Prior art solutions for balancing the large nose-down moments include the use of large inboard horizontal tails which carried large down-loads. Attempts at balancing the large yawing moments caused by loss of an engine included in the use of very large vertical tails for directional control. Although large vertical and horizontal tails reduce the effects of these problems, they increase aerodynamic drag and add extra weight to the aircraft.

Therefore, there is a definite need in the art for a high-lift aircraft in which the problems of nose-down pitching moments and the problem of yaw resulting from the loss of power from an engine are solved without adding weight or increasing aerodynamic drag.

It is therefore an object of the present invention to provide a high-lift aircraft which does not inherently generate nose-down pitching moments due to the high-lift generated by the flaps and which does not carry a down-load on the horizontal tail.

It is another object of the present invention to provide a high-lift aircraft in which the horizontal tail adds a positive increment to aircraft lift during cruise, take-off and landing.

It is a further object of the present invention to provide an apparatus and method for reducing the yaw in an aircraft resulting from flight with an engine inoperative.

Yet another object of the present invention is to provide a method for controlling aircraft thrust components during high-lift flight conditions without materially affecting the lift.

Another object is to provide a system for reducing noise radiating from the aircraft.

SUMMARY

The foregoing and other objects are attainable in the present invention by providing an aerodynamically balanced high-lift aircraft wherein: nose-down pitching moments generated by the high-lift flaps are eliminated by locating the centroid-of-lift of the flaps substantially at the aircraft center-of-gravity; longitudinal stability and control is provided by locating horizontal tails completely outboard of the tips of the aircraft wings; and yawing moments appearing when an engine is inoperative are reduced by conducting the high-energy exhaust of the engines through exhaust ducts exiting in the vertical plane of symmetry of the aircraft. Sideline noise and forward-radiated noise levels are substantially reduced due to the shielding effect of fuselages mounted at the tips of the wing. The relationship between thrust and drag, particularly for flight-path elevation control during landing approach, including emergency aborted landing, is rapidly controllable by means of an engine exhaust deflector which does not materially affect the lift of the aircraft.

Other embodiments of the present invention include, in addition to the two fuselages mounted at the wing tips, a centrally located fuselage mounted on the wing and particularly suitable for applications such as hydrogen-fueled aircraft where it is necessary to physically separate the crew and/or the passengers from the large volumes of fuel required and, alternatively, a centrally located forebody mounted on the wing for isolating the crew from the passengers.

BRIEF DESCRIPTION OF THE DRAWINGS

A more complete understanding of the present invention and many more of the attendant advantages thereof will be readily apparent as the same become better understood by reference to the following detailed description when considered in connection with the accompanying drawing wherein:

FIG. 4a is a side elevation of the engine nacelle shown in FIG. 3;

FIG. 4b is a rear elevation of the engine nacelle and exhaust duct system shown in FIG. 3;

FIG. 5 is a side elevation of the exhaust deflector plate of the present invention in the fully extended position;

DETAILED DESCRIPTION

Figure 1:
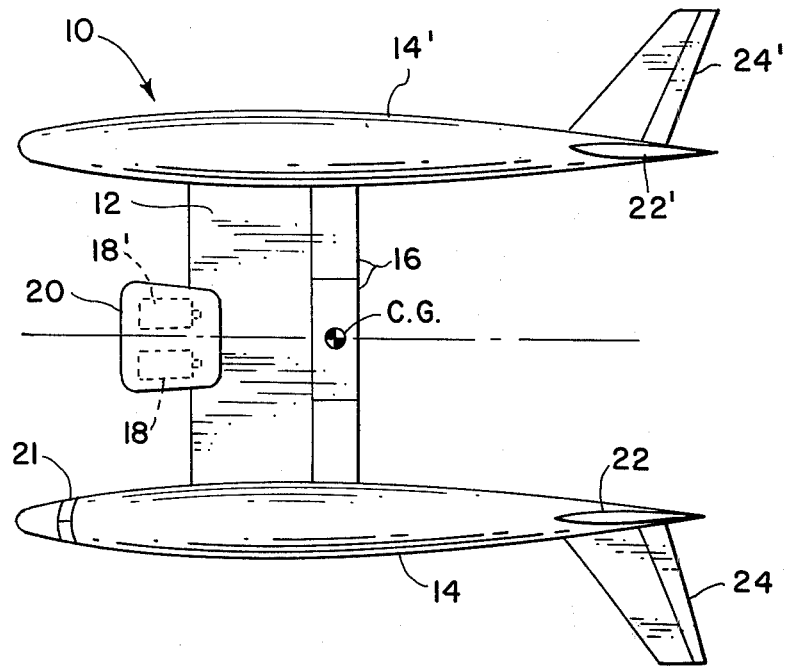
FIG. 1 is a top view of an aircraft of the present invention.
Figure 2:
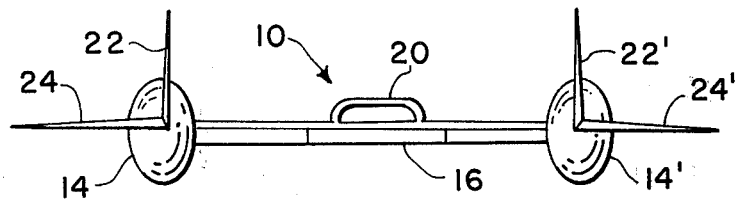
FIG. 2 is a rear elevation of the aircraft shown in FIG. 1.

Referring now to the drawing wherein like reference numerals refer to like parts throughout the several views, there is shown in FIGS. 1 and 2 an aircraft of the present invention and generally designated by reference numeral 10.

Aircraft 10 includes a horizontal and rectangular aircraft wing 12 bounded on the tips thereof by parallel aircraft fuselages 14, 14'. High-lift flaps 16 are formed along the entire trailing edge of wing 12 and twin propulsion engines 18, 18', such for example turbofan jet engines housed in common nacelle 20, are mounted on wing 12 in the vertical plane of symmetry of aircraft 10. Engines 18, 18' and nacelle 20 are disposed on the upper surface of wing 12 such that the exhaust flow emitted from macelle 20 flows over the upper surface of wing 12 and flaps 16 aft of propulsion engines 18, 18'. Twin vertical tails 22, 22' are mounted on the upper rear surfaces of fuselages 14, 14', respectively, and twin horizontal tails 24, 24' are mounted onto the rear outboard surfaces of fuselages 14, 14', respectively.

Aircraft 10 is configured such that the centroid-of-lift of flaps 16 is located substantially at the center-of-gravity (CG) of aircraft 10. A crew compartment 21 is shown formed in the nose of fuselage 14, although it could similarly be formed in fuselage 14' or part of the crew could be housed in each fuselage.

Figure 3:
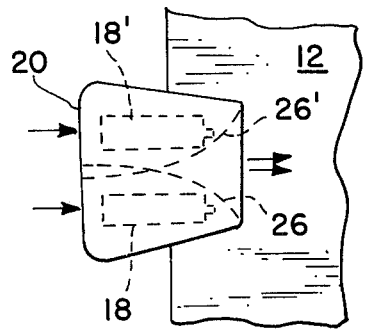
FIG. 3 is a top view of an engine nacelle and exhaust duct system of the present invention.

In FIGS. 3, 4a and 4b there is shown the exhaust flow system of aircraft 10. The exhausts of engines 18, 18' in nacelle 20 are segregated by two horizontal flow ducts 26, 26' which terminate at the rear of nacelle 20.

Ducts 26, 26' are enclosed completely within nacelle 20 and are in fluid connection with the exhaust of engines 18, 18', respectively. Ducts 26, 26' are arranged in an overlapping stacked relationship, each spanning the width of nacelle 20 at the exit thereof.

In FIG. 5 there is shown one high-lift flap 16 in the deflected position and an exhaust flow deflector plate 28 in the fully extended position. Plate 28 is an open-sided substantially rectangular plate extendably movable by mechanical linkages (not shown) and is housed, when in the unextended position, in the upper rear surface of nacelle 20. Plate 28 is rapidly controllable by the pilot to extend in varying degrees toward the upper surface of wing 12 and to retract back into nacelle 20. The gap 29 is formed between the rear edge of plate 28 and the upper surface of wing 12 when plate 28 is extended.

Figure 6:
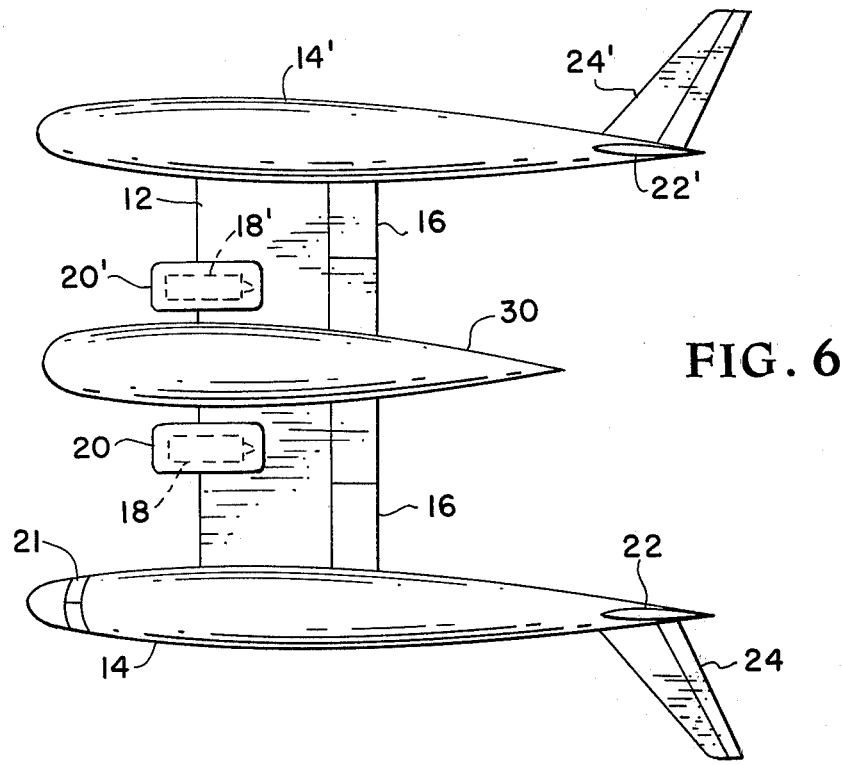
FIG. 6 is a top view of another embodiment of an aircraft of the present invention.

In FIG. 6 there is shown another embodiment of aircraft 10, wherein a central fuselage 30 is mounted on wing 12 in the vertical plane of symmetry of aircraft 10 and engines 18, 18' are disposed on opposite sides of fuselage 30 and are adjacent thereto. Fuselage 30 or fuselages 14, 14' can be used exclusively for the storage of fuel, cargo, or the like.

Figure 7:
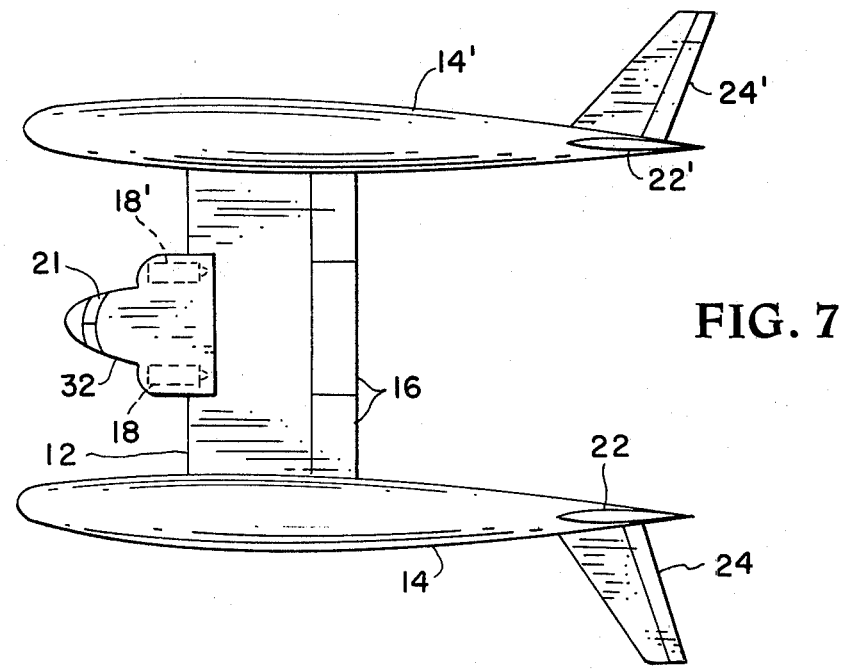
FIG. 7 is a top view of an additional embodiment of an aircraft of the present invention.

In FIG. 7 there is shown an additional embodiment of aircraft 10 wherein a central forebody 32, for the flight crew, is mounted on wing 12 in the vertical plane of symmetry of aircraft 10 and engines 18, 18' are disposed on opposite sides of central forebody 32 and are adjacent thereto.

OPERATION

Referring now back to FIGS. 1 to 4, during flight of aircraft 10, the exhaust from engines 18, 18' flows into exhaust ducts 26 26' and exits nacelle 20 in vertically adjacent overlapping horizontal planes in the vertical plane of symmetry of aircraft 10.

It can now be appreciated that since the exhaust flows of engines 18, 18' exit in vertically adjacent, horizontal streams in the vertical plane of symmetry of aircraft 10, the unbalanced moment about this plane, normally occuring when either of engines 18, 18' is inoperative, is less than the unbalanced moment which would occur if the exhausts of engines 18, 18' did not exit in the vertical plane of symmetry of aircraft 10. Since the unbalanced moment about this plane is reduced, the magnitude of yaw generated by these unbalanced moments is greatly reduced.

It can now also be seen that the high-energy exhausts of engines 18, 18' flow over the upper surfaces of wing 12 and flaps 16 aft of exhaust ducts 26, 26' and generate high-lift forces.

During takeoff and landing approaches, flaps 16 are deflected downward and deflector plate 28 is extended from nacelle 20 aftward and deflected downward such that a gap 29 is formed between the rear edge of plate 28 and the upper surface of wing 12. The high-energy exhaust exiting ducts 26, 26' is forced to flow through gap 29 and is partially deflected spanwise over wing 12 and flaps 16.

The degree of extension and deflection of plate 28 is dependent upon the requirement for the desired flight path. For example, during landing approach, plate 28 is extended aftward and downward to such a degree that a significant portion of engine exhaust flow spreads spanwise over flaps 16, thereby significantly decreasing the axial component of the thrust while causing only a negligible reduction in lift.

By significantly reducing the axial component of the thrust, while simultaneously keeping the lift constant, aircraft 10 can fly a descending approach while maintaining sufficient power to generate the high-lift necessary to remain airborne at low speeds. Thus, if the landing approach is aborted, plate 28 can be rapidly and partially retracted to the takeoff position to maintain the high-lift capability and to achieve climb capability, without having to increase the power setting of engines 18, 18'.

During the flight of aircraft 10 outboard horizontal tails 24, 24' are in an upwash field rather than in the severe downwash field typical of conventionally located horizontal tails on current powered-lift aircraft. Wind tunnel research has shown that horizontal tails located in upwash fields are approximately two-to-four times more effective as stabilizing devices than horizontal tails located in the severe downwash fields generated by power-lift flight. Moreover, by locating horizontal tails 24, 24' of aircraft 10 such that they are in an upwash field, aircraft 10 can be configured such that it is longitudinally stable with reasonably sized horizontal tails and with the center-of-gravity substantially at the centroid-of-lift of flaps 16. For powered-lift aircraft having conventionally located horizontal tails in downwash fields, this is not aerodynamically feasible. Also, by locating horizontal tails 24, 24' in an upwash field, the aerodynamic efficiency of aircraft 10 is increased as tails 24, 24' contribute positive lifting forces during all flight modes. Further the differential deflection of horizontal tails 24, 24' provides aircraft 10 with an effective primary source of roll control. Optional additional roll control is obtained by differentially deflecting outboard flaps 16.

It must also be noted that fuselages 14, 14' substantially shield the sideline and forward radiated noise levels of aircraft 10 generated by engines 18, 18'.

Referring now back to the embodiments of the aircraft shown in FIG. 6, there are mounted in both nacelles 20 and 20' deflector plates 28 which operate as described above. However, engines 18, 18' in nacelles 20, 20' in this embodiment are not equipped with exhaust ducts 26, 26'. This is because engines 18, 18' in this embodiment are separated from the vertical plane of symmetry of aircraft 10 by central fuselage 30.

Although the present invention has been described relative to specific embodiments thereof, it is not so limited and the specific examples are for illustration of the principle only and are not intended to serve as limitations thereof. Thus, modifications and variations in the specific embodiments described will be readily apparent to those skilled in the art in the light of the above tachings. It is therefore to be understood that within the scope of the appended claims the invention may be practiced otherwise than as specifically described herein.

What is claimed as new and desired to be secured by Letters Patent of the United States is:

1. A high-lift aircraft having a center-of-gravity comprising:
a wing provided with flaps having a centroid-of-lift;
a plurality of fuselages;
said wing carried by and mounted on the tips thereof by two of said plurality of fuselages;

said centroid-of-lift of said flaps being located substantially at the center-of-gravity of said high-lift aircraft;

a plurality of propulsion means carried by said wing;

at least two of said plurality of propulsion means grouped in a common nacelle located in the vertical plane of symmetry of the said aircraft, and each of said at least two of said plurality of propulsion means being in fluid connection with an exhaust duct, said exhaust ducts being arranged in a stacked overlapping relationship and located in said common nacelle, each of said at least two of said plurality of propulsion means exhausting high-energy air in the vertical plane of symmetry of said aircraft such that when any of said propulsion means is inoperative, yawing moments in said aircraft are minimized, a pair of horizontal tails fixed one each onto the outboard surfaces of the two of said plurality of fuselages mounted at the tips of said wing;

whereby, during high-lift flight said horizontal tails are in an upwash field and contribute a positive increment to trim lift;

nose-down pitching moments generated by said flaps are reduced as said flaps act substantially through said center-of-gravity of said aircraft; and, said plurality of fuselages serve to shield the noise radiated from said plurality of propulsion means.

2. The aircraft as in claim 1 including a crew compartment disposed in at least one of said plurality of fuselages.

3. The aircraft as in claim 1 wherein said wing flaps are segmented and said plurality of horizontal tails are differentially deflectable for rolling moment control with optional additional rolling moment control being obtained by differential deflection of outboard segments of the wing flaps.

4. The aircraft as in claim 1 including a thrust deflection apparatus comprising:

an exhaust deflector means housed in said propulsion means and controlled by the pilot of said aircraft for selectively, rapidly, and variably extending toward the upper surface of said wing and retracting back therefrom;

wherein said exhausting high-energy air flows between said deflector means and the upper surface of said wing and is deflected by said deflector means such that the axial thrust component of said exhausting high-energy air is reduced.

5. The thrust deflection apparatus as in claim 4 wherein said exhaust deflector means is an open-sided arcuately shaped rectangular plate mounted at the rear of an engine nacelle.

6. A high-lift aircraft having a center-of-gravity and comprising:

a wing provided with flaps having a centroid-of-lift, said centroid-of-lift of said flaps being located substantially at said center-of-gravity of said aircraft;

first and second fuselages mounted at the tips of said wing;

first and second horizontal tails mounted onto the outboard surfaces of said first and second fuselages;

a plurality of propulsion means carried by said wing;

said propulsion means being grouped in a common nacelle located in the vertical plane of symmetry of said aircraft and wherein each of said plurality of propulsion means is in fluid connection with an exhaust duct;

said exhaust ducts being arranged in a stacked overlapping relationship and housed in said common nacelle, each of said plurality of propulsion means exhausting in the vertical plane of symmetry of said aircraft such that when any of said plurality of propulsion means is inoperative, yawing moments in said aircraft are minimized, whereby, during high-lift flight said first and second horizontal tails are in an upwash field and contribute a positive increment to trim lift and nose-down pitching moments generated by said flaps are reduced as said flaps act substantially through said center-of-gravity of said aircraft.

* * * * *